(12) United States Patent
Deighton et al.

(10) Patent No.: US 10,113,077 B2
(45) Date of Patent: Oct. 30, 2018

(54) PRINTING INKS AND COATINGS COMPOSITIONS FOR POLYETHYLENE COATED BOARD

(71) Applicant: SUN CHEMICAL CORPORATION, Parsippany, NJ (US)

(72) Inventors: Rob Deighton, Halifax (GB); Gary Butler, Huddersfield (GB); Peter Salthouse, Knutsford (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 15/503,880

(22) PCT Filed: Aug. 19, 2015

(86) PCT No.: PCT/US2015/045814
§ 371 (c)(1),
(2) Date: Feb. 14, 2017

(87) PCT Pub. No.: WO2016/028850
PCT Pub. Date: Feb. 25, 2016

(65) Prior Publication Data
US 2017/0275483 A1    Sep. 28, 2017

Related U.S. Application Data

(60) Provisional application No. 62/039,560, filed on Aug. 20, 2014.

(51) Int. Cl.
| B32B 27/08 | (2006.01) |
| B32B 27/10 | (2006.01) |
| C09D 11/107 | (2014.01) |
| C09D 11/03 | (2014.01) |
| C09D 133/08 | (2006.01) |

(52) U.S. Cl.
CPC ............ *C09D 11/107* (2013.01); *C09D 11/03* (2013.01); *C09D 133/08* (2013.01); *C08L 2312/00* (2013.01); *C08L 2666/44* (2013.01)

(58) Field of Classification Search
None
See application file for complete search history.

(56) References Cited

U.S. PATENT DOCUMENTS

| 4,028,294 A * | 6/1977 | Brown ................. C08F 283/10 |
| | | 523/402 |
| 2005/0267234 A1* | 12/2005 | Kern .................... C09D 11/108 |
| | | 523/160 |
| 2007/0238813 A1 | 10/2007 | Anderson et al. |
| 2009/0088498 A1 | 4/2009 | Simpson, Sr. |
| 2009/0297796 A1* | 12/2009 | Menoud ............... C09D 11/102 |
| | | 428/195.1 |
| 2010/0283007 A1* | 11/2010 | Robinson ................ C09D 5/22 |
| | | 252/301.36 |

FOREIGN PATENT DOCUMENTS

| CN | 102 363 934 A | 2/2012 |
| WO | WO2013/113931 A1 | 8/2013 |

OTHER PUBLICATIONS

Home and Interior Design's Panel Recycling, downloaded from http://homeandinteriordesign.blogspot.com/2011/07/panel-recycling.html.*
PCT International Search Report issued in PCT/US2015/045814 dated Nov. 23, 2015.
Written Opinion of the International Searching Authority issued in PCT/US2015/045814 dated Nov. 23, 2015.
Supplementary Search Report issued in European Counterpart Application 15 83 3440 dated Mar. 12, 2018.

* cited by examiner

*Primary Examiner* — Vu A Nguyen
(74) *Attorney, Agent, or Firm* — Charles C. Achkar; Ostrolenk Faber LLP

(57) ABSTRACT

The present invention provides a printing ink or coating composition comprising a self-crosslinking acrylic polymer, a coalescent and a silicone emulsion wherein the self-crosslinking acrylic polymer has a glass transition temperature of greater than 25° C. Furthermore the present invention also provides a process for preparing a coated substrate, in particular a polyboard substrate and an article made from the coated substrate, such as a milk or juice carton.

19 Claims, No Drawings

PRINTING INKS AND COATINGS COMPOSITIONS FOR POLYETHYLENE COATED BOARD

CROSS REFERENCE TO RELATED APPLICATIONS

The present application is a § 371 National Phase application based on PCT/US2015/045814 filed Aug. 19, 2015, which claims the benefit of U.S. Provisional Application No. 62/039,560, filed Aug. 20, 2014, the subject matter of each of which is incorporated herein by reference in their entirety.

FIELD OF THE INVENTION

The present invention is directed to water-based inks and coating compositions for printing onto polyboard substrates which are primarily used for milk and juice cartons which are free of Bisphenol A (BPA) and polymers comprising BPA.

BACKGROUND OF THE INVENTION

Presently, water-based inks used for printing onto polyboard substrates primarily used for milk and juice cartons and other paper/board substrates are based on epoxy esters which contain Bisphenol A (BPA) and polymers comprising BPA. However, due to suspected toxicity, regulations are changing such that these inks can no longer contain Bisphenol A and polymers comprising BPA.

Consequently, there is a requirement to provide water-based inks for general printing, and in particular, for flexographic and gravure printing for polyboard substrates, that exhibit acceptable performance and do not contain Bisphenol A (BPA) and polymers comprising BPA.

WO 0073392 discloses the use of hybrid alkyd acrylic resins in inks for use on polythene coated board used for milk cartons.

US2009/0297796 discloses water based screen printing inks that may be suitable for other printing methods, primarily containing specialist pigments and a cross linker.

U.S. Pat. No. 7,807,739 discloses an aqueous composition for coating substrates comprising a cross linkable polymer, an acrylic polymer and an epoxysilane.

US2013/0309516 is directed to a coating composition having an acrylic polymer with a low glass transition temperature that contains a cross linkable functional group and a cross linking agent.

JP3301267 is directed to water color inks containing a resin for use on corrugated fiberboard.

Finally, CN101812255 is directed to an ink containing an acrylic resin for use on a high temperature resistance carton.

SUMMARY OF THE INVENTION

The present invention provides a printing ink or coating composition comprising
 a) at least one self-crosslinking acrylic polymer,
 b) at least one coalescent and
 c) at least one silicone emulsion
wherein the self-crosslinking acrylic polymer has a glass transition temperature ($T_g$) of greater than 0° C.

Furthermore the present invention also provides a process for preparing a coated substrate, in particular a polyboard substrate, with the ink or a composition printed thereon which comprises a) applying the printing ink or coating composition according to the invention to a surface of the substrate and
 b) drying the ink or composition.

These and other objects, advantages, and features of the invention will become apparent to those persons skilled in the art upon reading the details of the methods and formulations as more fully described below.

DETAILED DESCRIPTION OF THE INVENTION

It has now been found that a printing ink or coating composition containing a self-crosslinking acrylic polymer, a coalescent and at least one silicone emulsion can exhibit good adhesive properties along with the requisite resistance properties when the self-crosslinking acrylic polymer has a glass transition temperature of greater than 0° C.

The glass transition temperature herein relates to the acrylic polymer prior to self-cross linking.

These printing inks or coating compositions are of low toxicity and are capable of outperforming water-based inks that are based upon epoxy esters that contain Bisphenol A (BPA) and in particular, exhibit equivalent or better physical properties in terms of resistance to rub, water, milk, juice and line lubricant.

The printing ink or coating composition according to the present invention is substantially free of Bisphenol A (BPA) and is advantageously substantially free of epoxy esters.

Furthermore, the printing inks and coating compositions are typically water-based which provides for improved pigment wetting. This enables the printing inks and coating compositions to contain less colorant thus allowing for higher amounts of varnish. This in turn provides for maximum resistance whilst retaining color strength.

Preferably, the self-crosslinking acrylic polymer has a glass transition temperature of between 20 to 70° C. and advantageously between 40 to 60° C.

The self-crosslinking acrylic polymer is usually in the form of an aqueous dispersion or emulsion and is typically the product of at least two monomers that react with one another.

Furthermore, a self-crosslinking acrylic polymer refers to a one pack acrylic that whilst under ambient cure, can achieve curing, typically via a carbonyl/amine reaction. This can occur between ketone groups and bi- or polyfunctional amine compounds having groups that are reactive towards carbonyl groups. These acrylic polymers exhibit enhanced resistance properties in the resultant dried film.

The cross-linking reaction, depending upon the acrylic type, may also be initiated by the evaporation of water upon drying, a change of pH of the vehicle or by curing at elevated temperatures where the cross-linking reaction occurs faster or the reactive groups are de-blocked.

One example of self-crosslinking is shown in GB-A-2045768, which describes a dispersion which is based upon the emulsion polymerization product of a monomer mixture primarily comprising lower alkyl (meth)acrylate monomers, minor amounts of (meth)acrylic acid and glycidyl (meth)acrylate.

Self-crosslinking acrylic polymers may include binders selected from the group consisting of styrene-acrylic ester copolymer, a styrene/acrylic ester copolymer containing acrylamido groups and preferably a copolymer based on acrylonitrile, methacrylamide and acrylic ester.

Preferably, the self-crosslinking acrylic polymer is formed from reactive monomers which include at least one monomer selected from methyl acrylic acid (MAA), methyl methacrylate (MMA), butyl acrylate, butyl methacrylate, styrene and methyl styrene. Advantageously the self-crosslinking polymer is a styrene/acrylic ester copolymer.

In a preferred embodiment, the polymer is produced via a carbonyl/amine reaction, and advantageously an acrylate with a pendent N-methylol group (such as NIBMA) is used.

Examples of commercial acrylates formed from such monomers include Alberdingk AC2714VP, Synthomer AM00035, Organikkimyan Orgal P086V and DSM Neocryls XK12 & 14.

Usually, the printing ink or coating composition comprises between 20 to 60 wt % of self-crosslinking acrylic polymer, preferably between 30 to 50 wt % of self-crosslinking acrylic polymer and advantageously between 20 to 40 wt % of self-crosslinking acrylic polymer.

Advantageously, the coalescent is also an acrylic emulsion and typically has a glass transition temperature of less than 20° C., advantageously less than 0° C.

Examples of commercial coalescents include Dow Lucidene 605, DSM Neocryl A2095, and BASF Joncryl 8052.

Usually, the printing ink or coating composition comprises between 2 to 20 wt % of coalescent and preferably between 5 to 15 wt % of coalescent.

The printing ink or coating composition also comprises a silicone emulsion.

The addition of a silicone emulsion in the formulation helps to improve the chilled wet rub. Examples of commercially available silicones include Dow Corning DC84, DC 51, DC 209S, and Worleeadd 350. These silicones are high molecular weight polydimethylsiloxane emulsion, containing reactive silanol groups. Alternatively a blocked reactive silicone emulsions may be used.

Usually, the printing ink or coating composition comprises between 0.2 to 3 wt % of silicone emulsion and preferably between 1 to 2 wt % of silicone emulsion.

The printing ink or coating composition may further comprise a colorant. Such colorants typically include organic and inorganic pigment dispersions and dyes.

Typical pigment dispersions include Yellow 13; Orange 34; Red 122; Red 184; Red 266; Black 15:3; Violet 23; Green 7; and Blue 15:3;

Usually, the printing ink or coating composition comprises a standard acrylic base containing a pigment dispersion, in the amount of between 1 to 35 wt % and a varnish containing the self-crosslinking acrylic polymer, the coalescent and the silicone emulsion according to the present invention in the amount of between 65 to 99 wt %.

Preferably, the printing ink or coating composition comprises between 5 to 50 wt % of pigment dispersion, more preferably between 20 to 45 wt % of pigment dispersion and advantageously between 30 to 40 wt % of pigment dispersion.

The printing ink or coating compositions typically contain other additives, which may include wetting aids, alcohols, polyethylene wax emulsions, wax dispersions, antifoams, ammonia, defoamers, dispersants, stabilizers, silicones, rheological modifiers, plasticizers and the like.

Examples of such additives include isopropanol and n-propanol; polyethylene wax emulsions such as Munzing Lubraprint 2036 and Byk Aquacer 531; wax dispersions such as Munzing Lubraprint 499, Keim Ultralube D816 and Crayvallac WW1001; antifoams such as Byk 023 and Evonik Tegofoamex 1488; and wetting aids such as Evonik TegoWet 500 and Byk Dynwet 800.

The printing ink or coating composition according to the present invention may be used for any kind of printing but they are advantageously gravure or flexographic printing inks or coating compositions.

The inks of the present invention have been formulated preferably for use on polyethylene coated board substrates, e.g. polyboard, mainly used as containers (e.g. milk and juice containers). Other substrates may include corrugated paper, paper pre-corrugation, paper and general board.

In a particular embodiment of the invention the printing inks and coating compositions are formulated such that they can successfully adhere to a polyethylene layer and thus can be advantageously printed directly on "pre-formed" polyboard, as opposed to being printed initially on the board. This eliminates the need for extruding polyethylene over the top of a coated board after printing.

The printing inks and coating compositions of the present invention also preferably have indirect food contact status, have been successfully migration tested and all the materials used in therein are preferably Toxic Substances Control Act (TOSCA) and Food and Drug Administration (FDA) approved.

The present invention also provides a process for preparing a coated substrate with an ink or a composition printed thereon which comprises a) applying the printing ink or coating composition as herein described above to a surface of the substrate and b) drying the ink or composition.

Furthermore the present invention further provides articles, such as milk and juice cartons formed from the coated substrate.

The invention is further described by the examples given below.

EXAMPLES

Example 1. Formulation of Inks According to the Present Invention

Red, blue, black and green inks containing the materials (in weight percent) shown in table 1 were formulated.

TABLE 1

| Material | Ink 1 (Red) | Ink 2 (Blue) | Ink 3 (Black) | Ink 4 (Green) | Typical Range |
|---|---|---|---|---|---|
| Neocryl XK14 Acrylic emulsion | 39.7 | 39.7 | 39.7 | 39.7 | 20-60 |
| Joncryl 8052 | 7.9 | 7.9 | 7.9 | 7.9 | 5-15 |
| n-propanol | 2.9 | 2.9 | 2.9 | 2.9 | 1-5 |
| Aquacer 531 | 6.5 | 6.5 | 6.5 | 6.5 | 2-12 |
| Crayvallac WW1001 | 5.2 | 5.2 | 5.2 | 5.2 | 2-10 |
| Tego Foamex 1488 | 0.2 | 0.2 | 0.2 | 0.2 | 0.1-1.0 |
| Dynwet 800 | 1.3 | 1.3 | 1.3 | 1.3 | 0.2-3.0 |
| DC209S | 1.3 | 1.3 | 1.3 | 1.3 | 0.2-3.0 |
| Pigment Dispersion (Red) | 35.0 | — | — | — | 5-50 |

TABLE 1-continued

| Material | Ink 1 (Red) | Ink 2 (Blue) | Ink 3 (Black) | Ink 4 (Green) | Typical Range |
|---|---|---|---|---|---|
| Pigment Dispersion (50/50 Cyan and Violet - Blue) | — | 35.0 | — | — | |
| Pigment Dispersion (Black) | — | — | 35.0 | — | |
| Pigment Dispersion (Green) | — | — | — | 35.0 | |
| Total wt % | 100.0 | 100.0 | 100.0 | 100.0 | |

Example 2. Formulation of Inks Containing Various Self-Crosslinking Acrylic Polymers Ink formulations containing the materials as shown in table 2 were formulated wherein self-crosslinking acrylic polymers having varying glass transition temperatures were incorporated therein.

TABLE 2

| Material | Ink 5 Cyan | Comparative Ink 6 Cyan | Comparative Ink 7 Cyan | Ink 8 Cyan | Ink 9 Cyan |
|---|---|---|---|---|---|
| Neocryl XK14 Acrylic emulsion (Tg 50° C.) | 39.7 | — | — | — | — |
| Wallpol 01B Acrylic Emulsion (Tg −18° C.) | — | 39.7 | — | — | — |
| NeoRez R620 Polyurethane Emulsion | — | — | 39.7 | — | — |
| Orgal P086V Acrylic Emulsion (Tg 25° C.) | — | — | — | 39.7 | — |
| Alberdingk AC2714VP Acrylic Emulsion (Tg 43° C.) | — | — | — | — | 39.7 |
| Joncryl 8052 | 7.9 | 7.9 | 7.9 | 7.9 | 7.9 |
| n-propanol | 2.9 | 2.9 | 2.9 | 2.9 | 2.9 |
| Aquacer 531 | 6.5 | 6.5 | 6.5 | 6.5 | 6.5 |
| Crayvallac WW1001 | 5.2 | 5.2 | 5.2 | 5.2 | 5.2 |
| Tego Foamex 1488 | 0.2 | 0.2 | 0.2 | 0.2 | 0.2 |
| Dynwet 800 | 1.3 | 1.3 | 1.3 | 1.3 | 1.3 |
| DC209S | 1.3 | 1.3 | 1.3 | 1.3 | 1.3 |
| Pigment Dispersion (Cyan) | 35.0 | 35 | 35 | 35 | 35 |
| Total wt % | 100.0 | 100.0 | 100.0 | 100.0 | 100.0 |

Example 3. Printing and Ink Testing

The inks having a print viscosity of 12 seconds, Zahn 3 cup were printed onto a treated polyethylene board and then tested and compared to commercial inks containing Bisphenol A.

Table 3 shows the Satra rub resistance results, after 7 days ageing for the inks according to the present invention as listed in table 1 and commercial Flint Aquapak comparative epoxy ester inks.

TABLE 3

| Ink | Water | Milk | Juice | 1% Saniglide Line lube 3 Min. Drop Test | 1% Saniglide Line lube Complete removal | $H_2O_2$ Resistance 3 Min. Drop Test | $H_2O_2$ Resistance Complete removal | Chilled Wet Rub (Immersed) | Humid Wet Rub | Chilled Wet Rub (Sprayed Print) |
|---|---|---|---|---|---|---|---|---|---|---|
| Flint Red | 100 | 70 | 30 | 8 | 15 | 8 | 15 | 30 | 30 | 40 |
| Flint Blue | 70 | 50 | 30 | 8 | 25 | 8 | 25 | 25 | 30 | 30 |
| Flint Black | 30 | 40 | 40 | 6 | 10 | 7 | 15 | 10 | 20 | 10 |
| Flint Green | 60 | 40 | 20 | 7 | 15 | 7 | 25 | 20 | 40 | 20 |
| Ink1 Red | 100 | 60 | 40 | 8 | 15 | 7 | 15 | 30 | 30 | 50 |
| Ink2 Blue | 80 | 50 | 50 | 8 | 25 | 8 | 25 | 35 | 40 | 50 |
| Ink3 Black | 60 | 40 | 40 | 8 | 15 | 7 | 15 | 10 | 20 | 30 |
| Ink4 Green | 100 | 60 | 40 | 7 | 15 | 7 | 25 | 20 | 50 | 20 |

For the 3 min. Saniglide Line Lube and $H_2O_2$ Drop Test, 1 equates to poor (i.e. complete ink removal) whilst 10 equates to excellent (no ink removal) after 5 rubs.

Rubbing was then carried out to complete removal and the number of further rubs recorded. All the other tests record the number of rubs required for complete removal of the ink, a higher number of rubs being indicative of better rub resistance.

These results show that the inks described in the invention required more rubs for complete removal than for the present commercially available inks (Flint Aquapak), thus showing an improvement in overall resistance properties.

Example 4. Ink Testing for Inks Containing Self-Crosslinking Acrylic Polymers with Varying Glass Transition Temperatures Table 4 shows the Satra rub resistance results for self-crosslinking acrylic polymers with various glass transition temperatures.

TABLE 4

| Ink | Water | Milk | Juice | 1% Saniglide Line lube | | $H_2O_2$ Resistance | | Chilled | | |
| | | | | 3 Min. Drop Test | Complete removal | 3 Min. Drop Test | Complete removal | Chilled Wet Rub (Immersed) | Humid wet rub | Wet Rub (Sprayed Print) |
|---|---|---|---|---|---|---|---|---|---|---|
| Ink 5 | 100 | 60 | 50 | 8 | 15 | 7 | 15 | 30 | 40 | 50 |
| Ink 6 (comp) | 80 | 20 | 40 | 4 | <5 | 4 | <5 | 20 | 20 | 20 |
| Ink 7 (comp) | 40 | 40 | 40 | 4 | <5 | 4 | <5 | 30 | 30 | 30 |
| Ink 8 | 80 | 40 | 50 | 6 | 15 | 6 | 15 | 30 | 40 | 40 |
| Ink 9 | 80 | 40 | 50 | 6 | 15 | 6 | 15 | 30 | 40 | 40 |

It is shown below in Table 4 that when self-crosslinking acrylic polymers with a Tg less than 0° C. are used the resistance properties are much lower than the inks according to the present invention.

Ink 5 having an acrylic polymer with a glass transition temperature of 50° C. is preferred. However, ink 8 having a glass transition temperature of 25° C. and ink 9 having a glass transition temperature of 43° C. also exhibit improved physical properties.

Example 5. Physical Properties of the Inks According to the Present Invention Versus Comparative Commercial Inks The inks were printed on polythene extruded board and the surface treated to 40-44 dynes/cm, using a commercial Flexo press at 750 ft/min using a 360#, 6.0 cc/m2 volume anilox and photopolymer plate.

Table 5 shows that there is no deterioration of physical properties of the inks according to the present invention.

TABLE 5

| Other Testing | Comparative Commercial Inks: Flint Aquapak | Inks 1-4 |
|---|---|---|
| Adhesion Tape Test - Immediate | 100% | 100% |
| Scratch* - Immediate (High Force) | 10 (Black/Blue - 8) | 10 (Black - 9) |
| Resolubility | Standard | Equivalent |
| Wash-up | Standard | Equivalent |
| Printability, Flexo* | 9 | 10 |
| Gloss (60° C.) - 7 days | Red - 46.5, Blue - 38.9, Black - 39.3, Green - 40.0 | Red - 46.0, Blue - 40.0, Black - 41.4, Green - 39.9 |
| Static Slip - Face to back - 16 days | 0.26 | 0.25 |
| Dynamic Slip - Face to back - 16 days | 0.23 | 0.23 |
| Static Slip - Face to face - 16 days | 0.32 | 0.29 |
| Dynamic Slip - Face to face - 16 days | 0.19 | 0.20 |
| Blocking* - Face to Face - 16 days | 10 | 10 |
| Blocking* - Face to Back - 16 days | 10 | 10 |
| Hand Wet Rub Test* | 10 | 10 |

*10 = Excellent; 1 = Poor

Test Methods:
Printability (Flexo):
Visual assessment
Gloss (60°):
Gloss meter reading.
Wash Up:
Assessment from print crew
Resolubility:
Assessment from print crew
Scratch Resistance—
Proof print is laid print-side up on a hard surface and back of index finger nail scratched across surface. Print is evaluated for level of ink removal.
Satra Wet Rub
Using a Satra rub tester (Model STM 461), a water soaked felt pad (25 mm OD) under a specified load (1.8 Kg) is rotated on the surface of the print for 30 complete cycles. The print is examined for signs of ink removal and/or surface damage.

Prints were air dried for 7 days. The prints were then tested for the following reagents: Water, Milk, Orange Juice and Line lubricant (Saniglide) and hydrogen peroxide. For the line lubricant and $H_2O_2$, the line lubricant/$H_2O_2$ is placed on the print for three minutes and the print is given 5 subsequent rubs and assessed on a grey scale. The ink is then further tested to complete removal.

Chilled/Humid Print and Subsequent Satra Rub Test:

Prints are placed in a bucket of water and refrigerated/placed in 50° C. humid conditions for 16 to 24 hours. A test was also been carried out by spraying the prints with water and then positioning leaving in a fridge for 16 to 24 hrs. The procedure for Satra wet rub (water) was then followed.

Hand Wet Rub Test:

Grasp proof print with thumb and forefinger at either side of the print, hands approx. 1" apart, rotate vigorously for 50 cycles under running water, prints being face to face, to simulate repeated flexing of print. Assess level of ink removal and/or damage to print surface.

Adhesion Tape Test:

Apply Scotch 610 adhesive tape to the sample. Manually pull off the tape (slow, followed by fast pull) in a direction perpendicular to the surface of the print. The tape is pulled off immediately once it has been applied.

Blocking:

The samples are placed in the press as requested (face to face and/or face to back) and a pressure of 10 MPa is applied at room temperature for 10 minutes. The samples are visually inspected to ensure no blocking.

Slip Test Davenport Coefficient of Friction

Note: Using small sled for method ASTM D.1894—Speed 15 cm/min./Sensitivity×5.

1. Produce proof prints of the batch under test on the specified substrate(s). Print of sufficient width and length should be prepared.
2. Affix one sample of print, minimum 10 inches long, to the test bed with adhesive tape, ensuring it is held flat, smooth and unstretched.
3. Cut another piece of print, using appropriate template, and affix to the underside of the sled with adhesive tape. Ensure that the print surface is not touched.
4. Attach the cord to the sled, and place the latter gently onto the left-hand end of the print on the test bed, so that it is positioned centrally between the two L-shaped marks, with its leading edge in line with the right-hand edge of the marks. Leave a small amount of slackness in the cord.
5. Press the 'Start' button (and if measuring static slip, immediately re-set the digital display in order to ensure a false reading is not registered from start-up).
6. Static: Record the final (maximum) reading on the digital display, or the highest recorded force at the beginning of the recorder trace.
7. Dynamic: Note the highest and lowest readings, during the period of steady movement, on the needle scale, and record the mean of these values. If using a recorder, obtain the average of the trace during this period.

The coefficient of static and/or dynamic friction is given by:

$$\text{Coefficient of Friction} = \frac{\text{Force in grams}}{\text{Weight of sled in grams}}$$

Where the force in grams=reading multiplied by 10 for sensitivity×1
or =reading multiplied by 2 for sensitivity×5

While the present invention has been described with reference to the specific embodiments thereof, it should be understood by those skilled in the art that various changes may be made, and equivalents may be substituted, without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

The invention claimed is:

1. A milk or juice carton comprising a substrate coated with a printing ink or coating composition comprising:
    a) at least one self-crosslinking acrylic polymer;
    b) at least one coalescent; and
    c) at least one silicone emulsion;
    wherein the self-crosslinking acrylic polymer has a glass transition temperature of greater than 0° C.

2. The milk or juice carton according to claim 1, wherein the self-crosslinking acrylic polymer has a glass transition temperature of between 20 to 70° C., or between 40 to 60° C.

3. The milk or juice carton according to claim 1, wherein the self-crosslinking acrylic polymer is formed from monomers selected from methyl acrylic acid (MAA), methyl methacrylate (MMA), butyl acrylate, butyl methacrylate, styrene and methyl styrene.

4. The milk or juice carton according to claim 1, wherein the self-crosslinking polymer is a styrene/acrylic ester copolymer, or is formed from a carbonyl/amine reaction, or is an acrylic emulsion.

5. The milk or juice carton according to claim 1, wherein the coalescent has a glass transition temperature of less than 20° C., or less than 0° C.

6. The milk or juice carton according to claim wherein the coalescent is an acrylic emulsion.

7. The milk or juice carton according to claim wherein the silicone emulsion is high molecular weight polydimethylsiloxane emulsion containing reactive silanol groups.

8. The milk or juice carton according to claim 1, wherein the printing ink or coating composition comprises between 20 to 60 wt % of self-crosslinking acrylic polymer, or between 30 to 50 wt % of self-crosslinking acrylic polymer.

9. The milk or juice carton according to claim 1, wherein the printing ink or coating composition comprises between 2 to 20 wt % of coalescent, or between 5 to 15 wt % of coalescent.

10. The milk or juice carton according to claim 1, wherein the printing ink or coating composition comprises between 0.2 to 3 wt % of silicone emulsion, or between 1 to 2 wt % of silicone emulsion.

11. The milk or juice carton according to claim 1, wherein the printing ink or coating composition further comprises a colorant.

12. The milk or juice carton according to claim 11, wherein the colorant is a pigment dispersion.

13. The milk or juice carton according to claim 12, wherein the printing ink or coating composition comprises between 5 to 50 wt % of pigment dispersion, or between 20 to 45 wt % of pigment dispersion, or between 30 to 40 wt % of pigment dispersion.

14. The milk or juice carton according to claim 1, wherein the printing ink or coating composition further comprises one or more additives selected from the group consisting of wetting aids, alcohols, polyethylene wax emulsions; wax dispersions; antifoams; waxes, ammonia, defoamers, dispersants, stabilizers, silicones, rheological modifiers and plasticizers.

15. The milk or juice carton according to claim 1, wherein the printing ink or coating composition is a gravure or flexographic printing ink or coating composition.

16. The milk or juice carton according to claim 1, wherein the printing ink or coating composition is water-based.

17. A process for preparing the milk or juice carton according to claim 1, comprising
  a) applying the printing ink or coating composition according to claim 1 to a surface of the milk or juice carton; and
  b) drying the ink or composition.

18. The milk or juice carton according to claim 1, wherein the substrate is selected from polyethylene board, corrugated paper, and pre-formed polyboard.

19. The milk or juice carton of claim 1, wherein the printing ink or coating composition is substantially free of Bisphenol A (BPA), and/or is substantially free of epoxyesters.

\* \* \* \* \*